United States Patent [19]

Frappart et al.

[11] 4,312,023
[45] Jan. 19, 1982

[54] CERAMIC POWER CAPACITOR

[75] Inventors: Pierre Frappart; Serge Guichard; Roland Saint Marcoux, all of Bagnolet, France

[73] Assignee: L.C.C.-C.I.C.E. Compagnie Europeenne de Composants Electroniques, Bagnolet, France

[21] Appl. No.: 133,269

[22] Filed: Mar. 24, 1980

[30] Foreign Application Priority Data

Mar. 23, 1979 [FR] France ................. 79 07388

[51] Int. Cl.³ .................. H01G 1/08; H01G 1/10
[52] U.S. Cl. .................. 361/243; 361/275; 361/307; 361/308; 361/321
[58] Field of Search ............... 361/321, 275, 303, 308, 361/307, 309, 274

[56] References Cited

U.S. PATENT DOCUMENTS

| | | | |
|---|---|---|---|
| 1,391,672 | 9/1921 | Dublier | 361/274 |
| 2,315,199 | 3/1943 | Gonningen | 361/274 X |
| 3,256,471 | 6/1966 | Cowles | 361/321 X |
| 3,260,907 | 7/1966 | Weller et al. | 361/321 X |
| 3,437,736 | 4/1969 | Asher | 361/308 X |
| 3,452,257 | 6/1969 | Belko | 361/321 X |
| 3,496,434 | 2/1970 | Prokopowicz | 361/303 |

*Primary Examiner*—Elliot A. Goldberg
*Attorney, Agent, or Firm*—Oblon, Fisher, Spivak, McClelland & Maier

[57] ABSTRACT

A multilayer, ceramic dielectric power capacitor made of plural layers of thin films of dielectric material having a thickness between 20 and 200 microns and a dielectric strength which is greater than that of thick layers, but which reduces the volume of the capacitor. Formed on each dielectric thin film is a conductive foil having a thickness between 2 and 10 microns. The thickness of the dielectric films is quite thin to reduce the volume of the capacitor, while that of the foils is thick, as compared to the prior art, to facilitate removal of heat. An anti-corona groove is provided to protect the connections at the capacitor terminals. The capacitor is useful in high frequency generator applications.

7 Claims, 6 Drawing Figures

CERAMIC POWER CAPACITOR

BACKGROUND OF THE INVENTION

The present invention relates to power capacitors, more particularly to those operating at voltages of several thousand volts supplying an intensity which can reach several dozen amperes, such as those used in high frequency professional equipment. The ceramic dielectric capacitors presently used for high energy levels all have a common characteristic, namely that of having for each element only two electrodes, which, depending on the particular model, are either planar when the capacitors are shaped like discs or plates, or cylindrical which gives tubular capacitors. In its definitive form the dielectric is obtained by compressing and then baking or firing a powder. Therefore it is monolithic. The combination of a plurality of elements makes it possible to increase the power stored by these capacitors, however, the total volume rapidly reaches an unacceptable limit, because the power stored in each capacitor is relatively small compared with the volume. This power is in effect limited by poor heat exchanges to the outside, which have an effect on the voltage and intensity which can be permitted in the capacitor.

BRIEF SUMMARY OF THE INVENTION

The invention is therefore directed at optimising a ceramic dielectric power capacitor in which the armatures or foils, the dielectric and the connections have been designed in order to obtain characteristics making it possible to increase the voltages and intensities per unit of volume and consequently reduce the total volume of the capacitor, the heat exchanges being facilitated by a large number of means which will be described hereinafter.

More specifically the present invention relates to a ceramic power capacitor wherein it comprises a multi-layer body constituted by a stack of very thin ceramic dielectric films separating thick metal foils arranged in two alternating series, the dielectric films having larger dimensions than the foil forming on two opposite faces of the capacitor body, a protective volume in which a rounded groove is formed giving an anti-corona effect, as well as two external electrical connections, each connected to a series of foils by means of a metal coating made in the protective groove.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
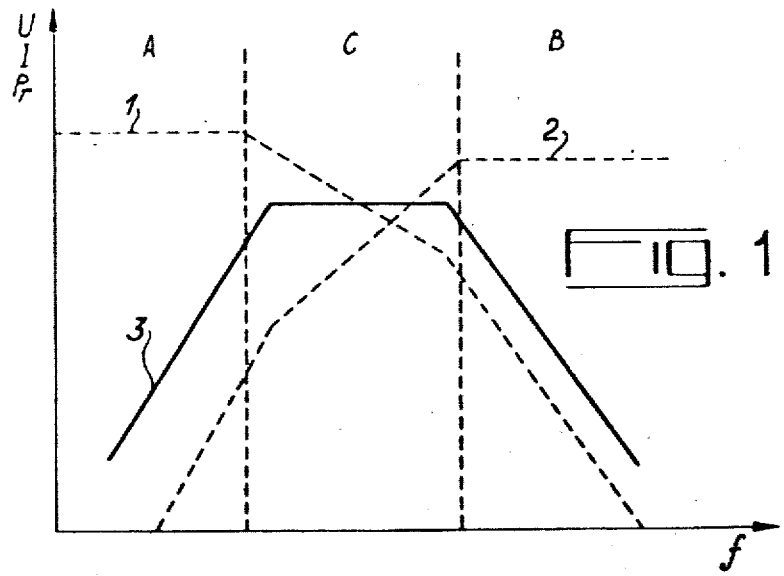
FIG. 1 the operating characteristic curves of power capacitors.

The curves of FIG. 1 give a better understanding of the operational limitations of power capacitors. Power capacitors are characterized by the parameters, voltage, intensity and reactive power.

The operating frequency is plotted on the abscissa, three curves being superimposed on the same graph, curve 1 corresponding to the voltage, curve 2 to the intensity, and curve 3 to the reactive power, whilst the units of voltage U, intensity I and reactive power $P_r$ are plotted on the ordinate in a linear scale.

The d.c. voltage, plus the superimposed high frequency peak voltage which can be withstood by a capacitor must be below the nominal voltage $U_n$. The dielectric strength of a capacitor i.e. its capacity to withstand puncturing under voltage is linked with the nature of the dielectric but also with the nature of its profile. In the present case the dielectric can be considered as a constant, because the invention relates to ceramic dielectric capacitors. However, the profile of the dielectric and the production process for the ceramic influence the voltage behaviour. The nominal voltage $U_n$ can reach 22 kV peak in presently used ceramic capacitors.

The operating voltage of a capacitor decreases as from a certain threshold, when the frequency increases (curve 1 of FIG. 1).

The intensity of the current passing through the capacitor must be below the maximum effective intensity eye fixed by the designer as a function of several parameters, such as the thickness of the foils or the diameter of the connections. The effective intensity increases up to the limit threshold, when the frequency increases (curve 2).

The reactive power of a capacitor is expressed by the formula $$P_r = U^2 C \omega = I^2 / C \omega$$

in which C is the capacitance of the capacitor and $\omega = 2\pi f$, f being the frequency.

It is limited by the heating of the capacitor whose maximum value must not exceed 30° to 45° C. in natural convection. The variation of the reactive power $P_r$, as a function of the frequency, has three main regions (curve 3).

(1) At low frequencies the limitation is due to the voltage which must not be exceeded and the reactive power increases with the frequency (region A of FIG. 1).

(2) At high frequencies the limitation of the reactive power is caused by the heating of the foils and the connections due to the intensity passing through the capacitor and the reactive power is inversely proportional to the frequency at constant temperature (region B).

(3) At intermediate frequencies the reactive power is constant and independent of the frequency at constant temperature (region C). The power limitation essentially results from losses in the dielectric which are proportional to the active power at the frequency in question, said losses resulting in an active power.

A first type of losses expressed by the formula $$Pa_1 = P_r \text{tg} \delta$$

in which tgδ is the loss angle in the dielectric is integrally transformed into heat in the dielectric and is removed by the foils and connections to the surface of the dielectric.

A second type of losses expressed by the formula $$Pa_2 = P_rR\ C\ \omega = RI^2$$

in which R is the equivalent series resistance of the capacitor, C the capacitance of the capacitor and ω the pulsation 2πf is due to the Joule effect. These losses of the second type appear, at high frequencies, in the foils and connection where they become preponderant and produce heating which is transmitted to the dielectric. The heat produced by the Joule effect are removed by convection to the surface of the foils.

These problems of removing heat given off by the loss effect are illustrated by three examples of prior art power capacitors.

Figure 2:
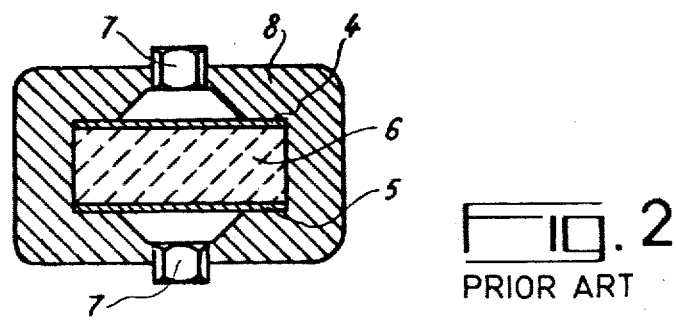
FIG. 2 a prior art power capacitor of the monolithic "disc" type.

FIG. 2 shows a "disc" capacitor formed by two metal foils 4,5 separated by one another by a monolithic dielectric 6. The electrical connection 7 on the two foils are generally provided by nuts, which are in themselves fixed to fixing clips in such a way that to distribute and disperse the high current density. Such disc capacitors are limited as regards voltage and therefore power by their very simple design, but more particularly by the poor heat exchanges to the outside, due to the relatively thick plastic protection 8. Heat is only substantially removed by the connections.

Figure 3:
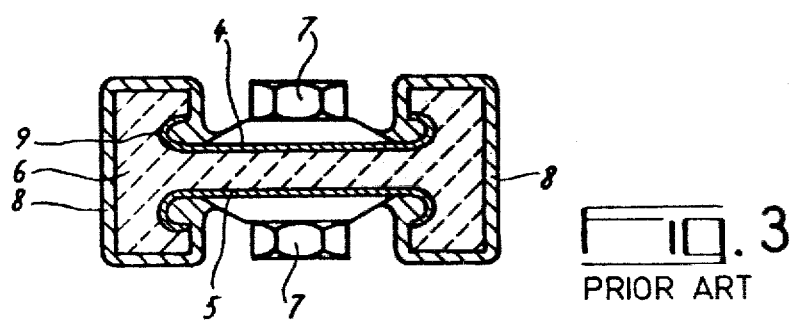
FIG. 3 another prior art power capacitor of the monolithic "plate" type.

FIG. 3 shows another prior art power capacitor of the "plate" type. The same reference numerals designate the same components as in FIG. 2 and this type of capacitor has two foils 4 and 5 deposited on a monolithic dielectric 6, the connections at 7 generally being provided by nuts. However, on each foil the plate-type capacitor have a groove 9 whose only function is to curve back the electric stray field. Dielectric 6 is adapted to the shape of the electrodes and externally covers the groove 9. A plastic protection 8 covers the entire capacitor, with the exception of the connection which are welded.

This type of capacitor is often adopted for more powerful models than those of the disc type, because it offers guarantees of completely satisfactory operation at high voltages, but still has the same disadvantages of a power limited by an inadequate removal of heat.

There are two possible solutions for increasing the power of the capacitor.

Figure 4:
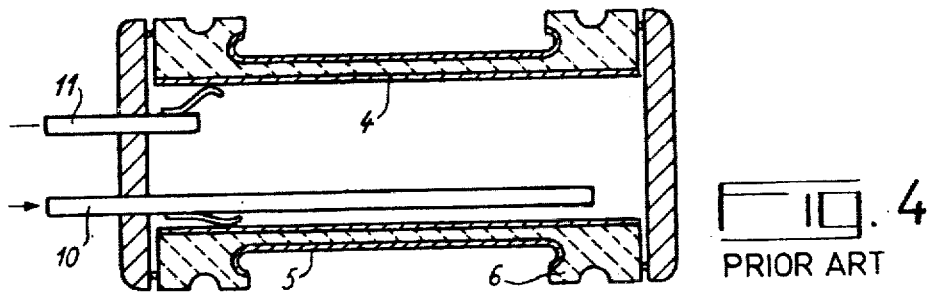
FIG. 4 a third prior art power capacitor of the monolithic tubular types.

A first solution illustrated by FIG. 4 which shows a prior art tubular capacitor consists of giving the power capacitor a shape such that it becomes possible to circulate a cooling fluid in a sealed enclosure which is the actual capacitor. This type of capacitor has two foils 4 and 5 deposited on the inner and outer surfaces of a dielectric 6 which is frequently cylindrical. Two flanges form the ends of the tube permitting the internal circulation of a cooling fluid which enters via a pipe 10 and is discharged via another pipe 11.

Tubular capacitors are used for higher power levels than the models described hereinbefore. However they have a number of disadvantages and the most serious of these are very large overall dimensions, delicate problems linked with the fact that the cooling fluid and its entire associated system is at the potential of the inner foil, so that it must be kept at 0 potential, liquid leaks are always possible and at high voltages these can have serious consequences on the surrounding equipment and the monolithic ceramic block can be cracked due to thermal shocks.

The solution used for the capacitor according to the present invention aims at increasing the stored power per unit of volume by making it independent of an internal cooling system.

The invention relates to a power capacitor having an excellent reactive power/volume ratio obtained by the alternate stacking of very thin dielectric layers and thick foils, the thin film dielectric having a dielectric strength higher than that of the same dielectric in a thicker form in monolithic blocks, which contributes to reducing the dimensions of the capacitor and thus aids the removal of the heat produced.

Thus, the active energy produced within the capacitor is removed by thermal conduction by means of metal strips serving as foils or armatures whereby the large number of said strips and the thickness given to them aid the thermal conduction and render uniform the temperature within the dielectric. Moreover, a better shape of the dielectric and the armatures make it possible to reach very high voltages and consequently to obtain higher powers.

Thus, a capacitor according to the invention corresponds to a miniaturization of the order of 5 to 10 compared with "plate" capacitor of the same capacitance or, for the same volume corresponds to an increase in the reactive power of an order of magnetude of 5 to 10.

Figure 5:
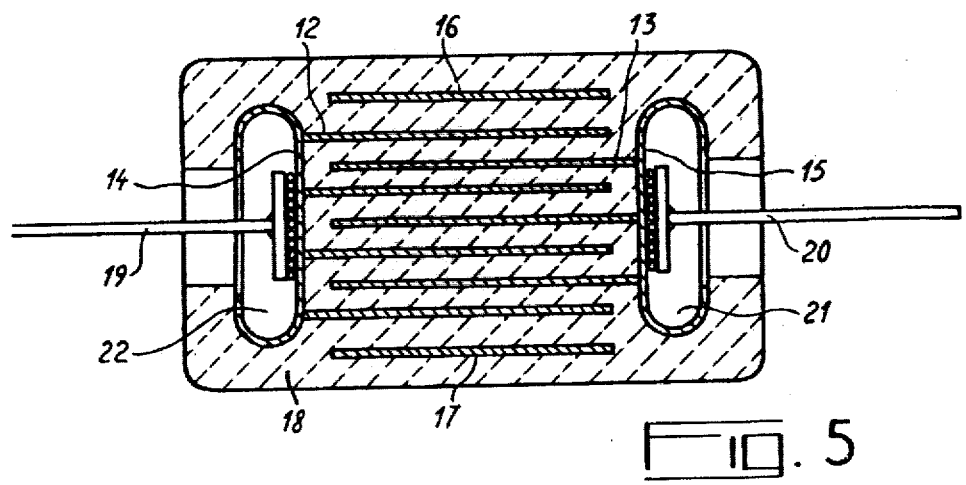
FIG. 5 a sectional view of a multilayer capacitor according to the invention.

FIG. 5 shows in sectional form in a plane perpendicular to that of the armatures a multilayer power capacitor according to the invention.

The capacitor according to the invention has two series of armatures 12 and 13, stacked to form a multilayer device. The stack alternately contains an armature of series 12 and then an armature of series 13, separated by a very thin ceramic dielectric film. The two series of armatures, which have the same shape and surface area are slightly staggered with respect to one another in one direction to permit electrical contacting at the exposed end of the armatures. Thus, the series of armatures 12 is joined by a metal coating 14 in accordance with which armatures 12 are mounted in parallel. In the same way the series of armatures 13 is joined by a metal coating 15. The stack is completed at both ends by two floating armatures 16,17, i.e. two armatures which are not connected to an electrical connection, their function being to close again the external stray field and thus minimise leaks by a better distribution of the potential gradient.

The ceramic dielectric 18 separates the armatures or foils in the stack. However, in addition, its external dimensions on the faces of the capacitors carrying the metal coatings 14 and 15 are such that the dielectric envelops the metal coatings and part of the electrical connections 19, 20 forming two grooves 21, 22, whose function will be described hereinafter.

The electrical connections 19, 20 are in the form of a silver strip, whose very good electrical and thermal conductivity is well known. These connections are joined to the metal coatings 14, 15 either by a tin-lead-based brazed joint which melts at approximately 300° C., or by a silver alloy-based brazed joint or by fritting. The later process is new in this application to capacitor connections and consists of fritting the connecting strip to the metal coating by means of an enamel formed from glass powder and silver powder. The glass particles aid the engagement of the surfaces and the silver particles reduce the resistance of the contact and limit heating.

The operating temperature of a thus fritted connection reaches 700° C.

Figure 6:
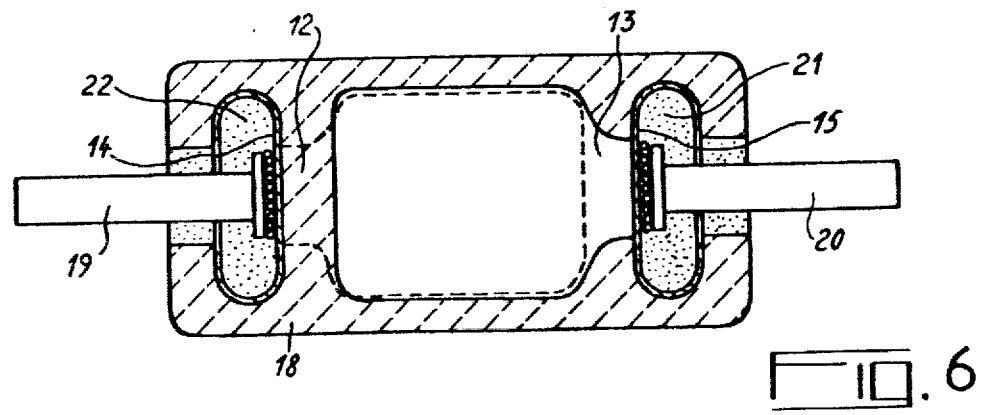
FIG. 6 a plan view of the capacitor according to the invention.

FIG. 6 shows the same capacitor according to the invention in a plan view displaced by 90° with respect to the section of FIG. 5. FIG. 6 shows a foil 13, in the plane of the drawing staggered with respect to a foil 12, from which it is separated from a dielectric layer. The other parts of the capacitor, except for the connection strips 19 and 20, are identical to those of FIG. 5, because grooves 21 and 22 are symmetrical and oblong.

A certain number of special and original points which will now be described make the capacitor according to the invention superior with regards to the voltage behaviour, the admitted intensity, the thermal dissipation and consequently in reactive power.

With regard to the voltage behaviour two series of means relate to the dielectric and to the foils.

The intrinsic dielectric strength of ceramic dielectrics such as those used for power capacitors reaches 250 to 200 kV/mm. However, the practical values in prior art capacitors, such as the "disc" models having a monolithic dielectric block do not exceed 2 to 4 kV/mm, i.e. approximately 1/100th of the theoretical value.

The improvement provided by multilayer power capacitors consists of making very thin ceramic films with a thickness between 20 and 200 microns, but more commonly between 40 and 100 microns, whose true dielectric strength is approximately 20 kV/mm, i.e. five times higher than that of monolithic blocks.

Moreover the shape of the foils is modified to prevent the point effect. There general shape is rectangular with pronounced rounding of angles which contributes to reducing the losses by point effect and permits a higher voltage without causing the puncturing of the dielectric layers.

Floating armatures 16, 17 have a shielding action and also make the stray field more uniform due to a better distribution of the potential gradient. They cooperate with metallized grooves 21, 22 enclosing the stray field on itself.

In order to limit the corona effect, increase the sparking voltage and provide an adequate insulation, the dielectric projects over the faces of the capacitor carrying the connections and forms two grooves 21, 22. Thus, the foils are suffiently retracted with respect to outer edges of the capacitor to ensure a good insulator relative to earth, the retraction being 1 mm/5 KV i.e. in practice a groove of depth 2 to 3 mm. Moreover the grooves 21, 22 are peripherally rounded, so that the contacting metal coating 14, 15 are themselves rounded which has the effect of curving the stray field back on itself by lengthening the leakage paths and preventing point effects. The metal coatings 14, 15 stop in a retracted position from the inner angle of the outlet groove. At the end of manufacture grooves 21, 22 are filled with an electrically insulating solid polymer, which cooperates in insulating the metal coating relative to earth and considerably improve the resistance to tearing away of connections 19 and 20.

The construction of the capacity according to the invention takes account of the intensity which must pass through it. Thus, in order to permit the passage of high currents without causing internal heating, whilst ensuring a good heat transfer as well as a good uniformity of temperature within the multilayer block, the thickness of the foils is between 2 and 10 microns, as compared with 1 or 2 microns in the case of the prior art capacitors. The foils are made from alloys such as Ag/Pt, Ag/Pd, Au/Pt/Pd or purer metals such as Pt, Pd etc. The increase in the thickness of the foils in an average ratio of 3 cooperates with the reduction of the thickness in the dielectric to facilitate the removal of active power $Pa_2$, and consequently increase the generally available reactive power Pr with a considerable gain in volume. Thus, for example, a capacitor according to the invention replaces a plate-type capacitor in a volume 5 to 10 times smaller and for an identical function. Moreover the parallelepipedic shape of the capacitor according to the invention facilitates its stacking for installation in series or in parallel.

The operating temperature can reach 700° C. without damaging the capacitor, due to the silver fritting of the connection to the foil.

Finally the association of the capacitor according to the invention with a cooling system increases the reactive power by a factor between 2 and 100, depending on the system used from the natural convection heater to the cooling enclosure by heat pipe.

The capacitor according to the invention is also automatically protected as a function of its geometry according to which the foils are located within a ceramic block and the outer connections are connected to metal coatings arranged within the grooves. There is no need for an external protective covering a coating of identification paint or enamel being sufficient.

What is claimed is:

1. A multilayer ceramic power capacitor comprising:
   a stack of ceramic dielectric films separating metal foils arranged in two alternating series,
   said ceramic dielectric films each having a thickness between 20 and 200 microns,
   said foils each having a thickness between 2 and 10 microns, thus constituting means for removing the heat produced within the capacitor by dielectric losses, and
   the dielectric films having larger dimensions than the foil forming on two opposite faces of the capacitor body, a protective volume in which a rounded groove is formed giving an anti-corona effect, as well as two external electrical connections, each connected to a series of foils by means of a metal coating made in the protective groove.

2. A power capacitor according to claim 1, wherein the anti-corona groove lengthens the leakage paths of the electric field on the periphery of the contacting metal coating and ensure the mechanical protection and electrical insulation relative to the metal coating earth.

3. A power capacitor according to claim 1, wherein the metal foils are rectangular with rounded angles in order to prevent point effect at high voltages.

4. A power capacitor according to claim 1, wherein two floating armatures, which are not electrically connected are arranged externally on the stack of foils and reduce the potential gradient outside the capacitor and cooperate with the metalised grooves to make the stray field close on itself.

5. A power capacitor according to claim 2, wherein the arrangement of the foils within a ceramic block and the positioning of the connections within grooves cut into the ceramic block constitute an automatic protection of the capacitor.

6. A power capacitor according to claim 1 or claim 3, wherein the external connections in the form of silver strips are fritted to the contacting metal coating by means of a silver-based enamal thus enabling the capacitor to operate reliably up to 700° C.

7. A power capacitor according to claim 6, wherein the grooves are filled with a solid polymer which acts as electrical installation and improves the resistance to tearing out the connections.

* * * * *